(12) United States Patent
Su et al.

(10) Patent No.: US 8,133,931 B2
(45) Date of Patent: Mar. 13, 2012

(54) ACRYLATE NANOCOMPOSITE MATERIAL

(75) Inventors: Wei-Fang Su, Taipei (TW); Sheng-Hao Hsu, Taipei (TW); Chein-Chih Lin, Taipei (TW); Min-Huey Chen, Taipei (TW)

(73) Assignee: National Taiwan University, Taipei (TW)

( * ) Notice: Subject to any disclaimer, the term of this patent is extended or adjusted under 35 U.S.C. 154(b) by 398 days.

(21) Appl. No.: 12/544,390

(22) Filed: Aug. 20, 2009

(65) Prior Publication Data

US 2010/0113638 A1    May 6, 2010

(30) Foreign Application Priority Data

Nov. 4, 2008 (TW) ............................. 97142452 A

(51) Int. Cl.
 *C08F 2/50* (2006.01)
 *C08F 2/46* (2006.01)
 *C08G 65/18* (2006.01)
 *C03C 25/10* (2006.01)
(52) U.S. Cl. .............. 522/39; 522/172; 522/167; 522/33
(58) Field of Classification Search .................... 522/39, 522/33, 172, 167
See application file for complete search history.

(56) References Cited

U.S. PATENT DOCUMENTS

| 4,430,418 A * | 2/1984 | Goff ........................... 430/288.1 |
| 5,310,862 A * | 5/1994 | Nomura et al. ................ 528/353 |
| 2004/0081844 A1 * | 4/2004 | Bharti et al. ................... 428/523 |

OTHER PUBLICATIONS

Sheng-Hao Hsu, Chien-Chih Lin, and Wei-Fang Su, Transparent photocurable fluoroimidized acrylate nanocomposite for optoelectric device encapsulation, Aug. 20, 2008, Hybrid Nanomaterials: Impact on Modern Materials and Opportunities for Industrial Applications, Sheraton Philadelphia City Center, USA.

* cited by examiner

*Primary Examiner* — Mark Eashoo
*Assistant Examiner* — Jessica Paul
(74) *Attorney, Agent, or Firm* — WPAT, PC; Justin King

(57) ABSTRACT

The present invention discloses an acrylate nanocomposite material which can apply to optoelectronic device encapsulation, dental restorations and light waveguide. The acrylate nanocomposite material comprises an inorganic nano-particle, an acrylate monomer with at least one acrylate group, an imidized acrylate oligomer and a photo-initiator. The acrylate nanocomposite material photopolymerizes to form an organic/inorganic 3D network wherein the absorption (%) is 0.01 to 5.00 and the permeability (g mm/m$^2$ day) is 0.01 to 10.00 thereof. In addition, the transmittance of the nanocomposite is over 90%.

14 Claims, 5 Drawing Sheets

ACRYLATE NANOCOMPOSITE MATERIAL

BACKGROUND OF THE INVENTION

1. Field of the Invention

The present invention is generally related to an acrylate nanocomposite material, more particularly to an acrylate nanocomposite material applicable for optoelectronic device encapsulation, dental restorations and light waveguide.

2. Description of the Prior Art

Inorganic fillers have been introduced into polymer materials for enhancing their mechanical properties and thermo stability. The inorganic substance, with their surface modified by silane coupling agents, generally has a wide applicability. For example, in the production of reinforced plastics, if the inorganic fiber is immersed in the silane solution prior to being coupled to the plastic molecules, the interface bonding force will increase, leading to enhanced overall strength of the produced material.

For the inorganic materials used in the semiconductor industry, such as the silicon wafer, silane coupling agents can change the material's chemical properties and hydrophobicity as required. In addition, the silane coupling agent can improve the bonding strength of the organic substance to inorganic particles, thereby improving the mechanical properties and interface properties of the resultant materials.

The fluorine atom has a smaller atomic diameter and strong electronegativity, therefore is able to form more stable bonding with the carbon atoms, as compared to other halogens. Making use of this property, several high performance fluorine-containing aromatic polymers have been developed over the recent years. For example, fluoro-polyimides have an improved solubility, processability and transmittance. Moreover, they have a lowered dielectric constant and water absorption rate. These properties have gained fluoro-polyimides more and more intention for application in the electronic and optoelectronic industries.

Accordingly, development of materials having the above mentioned superior properties is generally urged. The present invention is intended to contribute to such effort.

SUMMARY OF THE INVENTION

The present invention discloses an acrylate nanocomposite material to fulfill the industrial requirements.

The present invention is characterized by disclosing an acrylate nanocomposite material which is applicable for optoelectronic device encapsulation, dental restorations and light waveguide. The disclosed acrylate nanocomposite material comprises an inorganic nano-particle, an acrylate monomer with at least one acrylate group, an imidized acrylate oligomer and a photo-initiator. The above components photopolymerize to form an organic/inorganic percolation network which has a water absorption rate (%) between 0.01~5.00, and a water permeation rate (g mm/m$^2$ day) is between 0.01~10.00.

In summary, the present invention discloses an acrylate nanocomposite material with a low water absorption rate and water permeation rate. The disclosed material further has a transmittance higher than 90%. Therefore, the disclosed material is suitable for optoelectronic device encapsulation.

DESCRIPTION OF THE PREFERRED EMBODIMENTS

Figure 1:
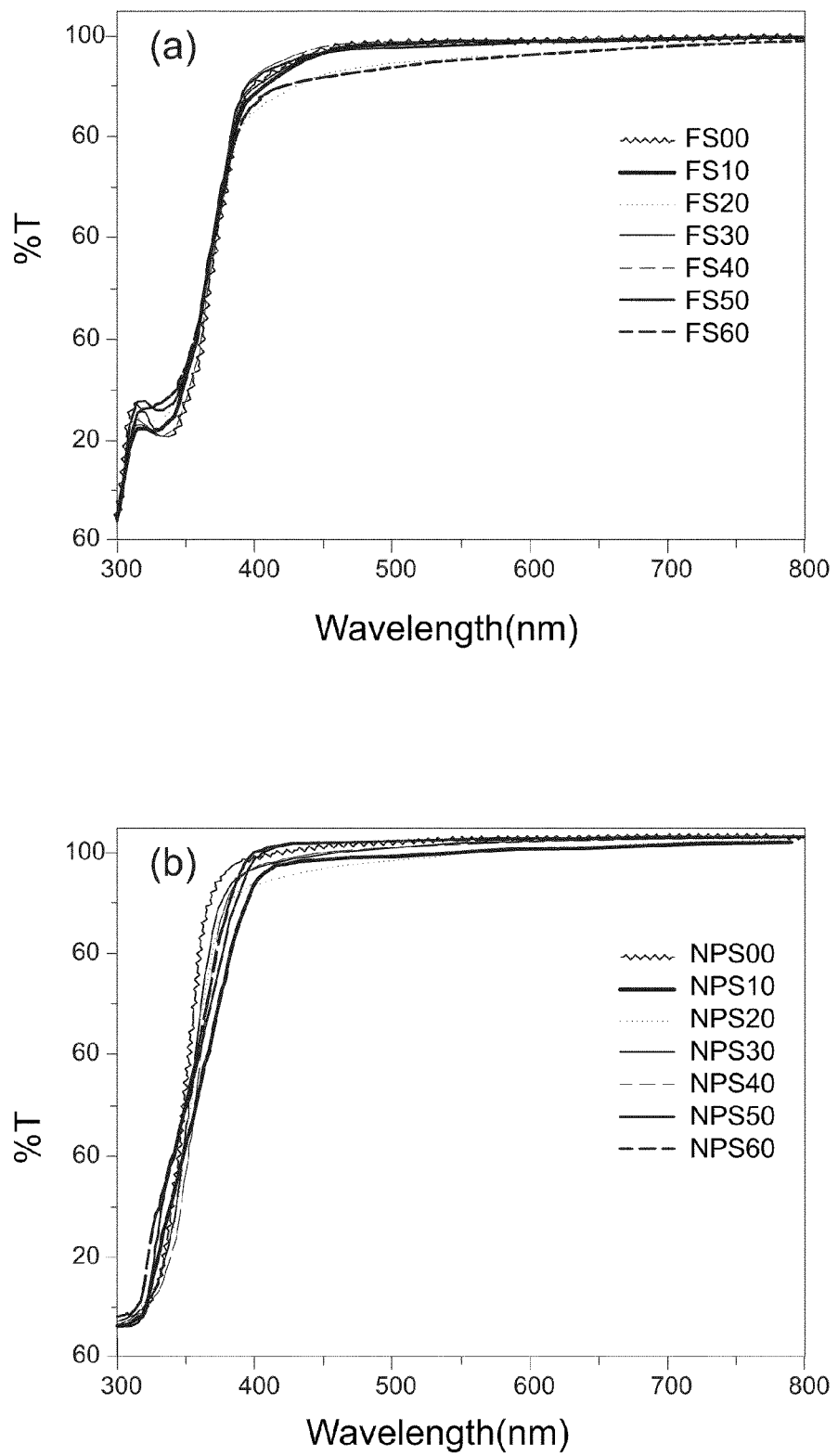
FIG. 1 is a diagram showing the light transmittance the organic/inorganic nanocomposite with various compositions, wherein (a) indicates the FS and (b) indicates the NPS series samples.

The present invention relates to an acrylate nanocomposite material, more particularly to an acrylate nanocomposite material applicable for optoelectronic device encapsulation, dental restorations and light waveguide.

One embodiment of the present invention discloses an acrylate nanocomposite material which comprises an inorganic nano-particle, an acrylate monomer with at least one acrylate functional groups, an imidized acrylate oligomer and a photo-initiator. The disclosed acrylate nanocomposite material contains photoinitiator that can be photopolymerized by light to form 3D-network. The inorganic nano-particle has a particle size of 10 nm to 100 nm and exists with a content of 10% to 80% in the disclosed acrylate nanocomposite material.

The inorganic nano-particle is obtained from an inorganic nano-particle colloidal solution and a coupling agent. The inorganic nano-particle colloidal solution comprises a surface that has a first inorganic nano-particle with a first silanol functional group. The coupling agent comprises an acrylate group at one end, and one to three alkoxide group at the other end. The coupling agent undergoes a hydrolysis reaction after which the alkoxide group forms a second silanol functional group. The first and second silanol functional groups then react with each other to form a bonding therebetween, resulting in a reactive acrylate group on the surface of the inorganic nano-particle.

The inorganic nano-particle is selected from a group consisting of the following: $SiO_2$, $ZrO_2$, $TiO_2$, $Al_2O_3$, $ZnO_2$, $Fe_2O_3$, $SnO_2$, $Y_2O_3$, $GeO_2$, $Ni_2O_3$ and $HfO_2$. In one example, it is selected to be $SiO_2$, $ZrO_2$, $TiO_2$ or $Al_2O_3$. The coupling agent is selected from a group consisting of the following: 3-methacryloxypropyl trimethoxysilane (MPS), 3-methacryloxypropylmethyl dimethoxysilane, 3-acryloxypropyl trimethoxysilane, 2-methacryloxyethyl trimethoxysilane, 2-acryloxyethyl trimethoxysilane, 3-methacryloxypropyl triethoxysilane, 3-acryloxypropyl triethoxysilane, 2-methacryloxyethyl triethoxysilane, and 2-acryloxyethyl triethoxysilane. In one example, it is selected to be MPS, 3-acryloxypropyl trimethoxysilane or 3-acryloxypropyl triethoxysilane.

The imidized acrylate oligomer comprises a first structure and a second structure. The first structure comprises an imide oligomer formed from a diamine monomer and a dianhydride monomer. The second structure is hydroxyl acrylate monomer. The first structure reacts with the second structure to form the imidized acrylate oligomer. The hydroxyl acrylate monomer is selected from a group consisting of the following: ethoxylated hydroxyethyl methacrylate (EOHEMA), 4-hydroxybutyl acrylate (4HBA), 2-hydroxyethyl methacrylate (HEMA), and 2-hydroxypropyl methacrylate (HPMA). In one example, it is selected to be HEMA.

The disclosed acrylate nanocomposite material may further comprise at least one compound having the acrylate group, wherein the compounds may be a monomer or an oligomer, and are selected from a group consisting of the following: 1,4-butanediol diacrylate (BDDA), 1,4-butanediol dimethacrylate (BDDMA), 1,3-butylene glycol diacrylate (BGDA), 1,3-butylene glycol dimethacrylate (BGDMA), diethylene glycol diacrylate (DEGDA), diethylene glycol dimethacrylate (DEGDMA), dipropylene glycol diacrylate (DPGDA), ethylene glycol dimethacrylate (EGDMA), ethoxylated bisphenol A diacrylate (EOBDA), 1,6-hexanediol diacrylate (HDDA), 1,6-hexanediol dimethacrylate (HDDMA), neopentyl glycol diacrylate (NPGDA), neopentyl glycol dimethacrylate (NPGDMA), tetraethylene glycol diacrylate (TEGDA), tetraethylene glycol dimethacrylate (TEGDMA), triethylene glycol diacrylate (3EGDA), triethylene glycol dimethacrylate (3EGDMA), and tripropylene glycol diacrylate (TPGDA). In one example, it is selected to be DEGDA, DPGDA, EOBDA, TEGDA, or TPGDA.

The photo-initiator is selected from a group consisting of the following: 2,2-dimethoxy-2-phenyl-acetophenone (Irgacure 651), 1-hydroxy cyclohexyl-phenyl-ketone (Irgacure 184),

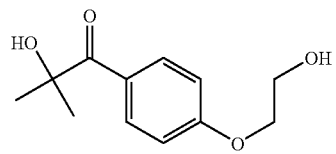

(2-hydroxy-1-[4-(2-hydroxyethoxy)phenyl]-2-methyl-1-propanone (Irgacure 2959),

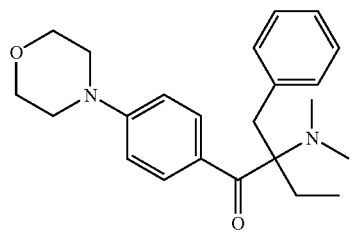

(2-benzyl-2-(dimethylamino)-1-[4-(4-morphoinyl)phenyl]-1-butanone (Irgacure 369), and

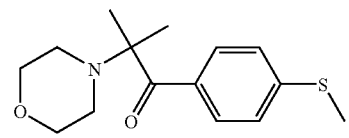

(2-methyl-1-[4-(methylthio)phenyl]-2-(4-morpholinyl)-1-propanone (Irgcure 907). In one example, it is selected to be Irgacure 651 or Irgacure 184.

In one example, the imidized acrylate oligomer has a general formula as the following:

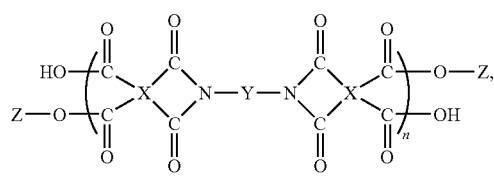

wherein n≧1, and X is selected from a group consisting of the following:

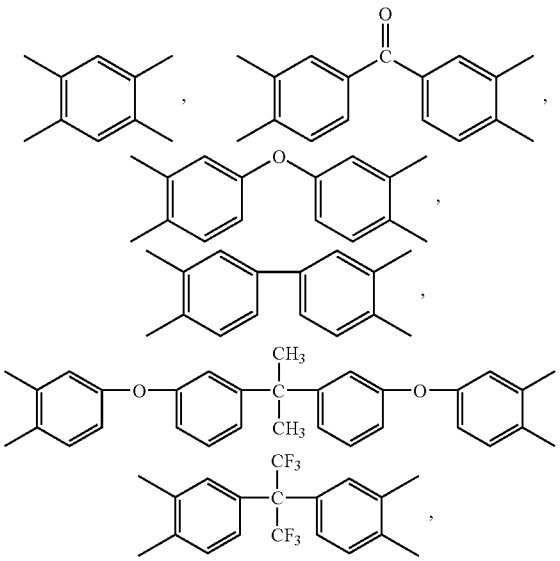

and is in one example selected to be

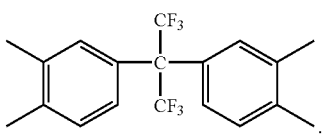

On the other hand, Y is selected from a group consisting of the following:

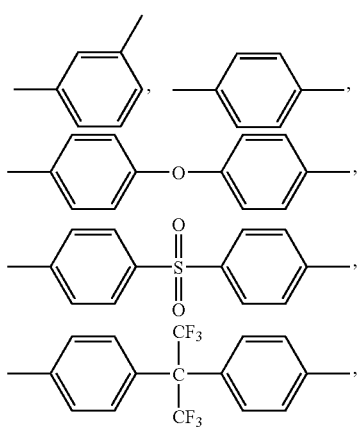

-continued

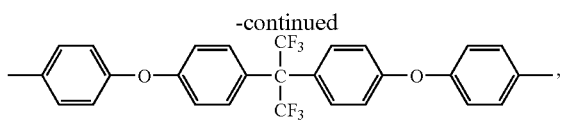

and is in one example selected to be

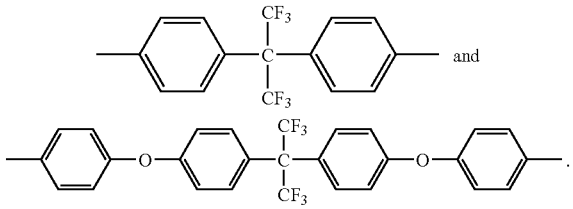

Z is a hydroxylpropyl ester monomer.

The disclosed acrylate nanocomposite material can be applied for optoelectronic device encapsulation, dental restorations and light waveguide. The disclosed material has, after photopolymerization, an organic/inorganic 3D network nanocomposite with a water absorption rate (%) between 0.01~5.00 and a water permeation rate (g mm/m$^2$ day) between 0.01~10.00.

Example 1

Production of Acrylate Nanocomposite Material (i) Surface modification of Inorganic Nano-Particles First, 20 ml silica colloidal solution (MA-ST-M) is mixed with 20 ml methanol for 10 minutes. Then, the mixture is added with 2 ml coupling agent (MPS) and reacted at an environmental temperature of 50° C. for 24 hours, so as to form nano-inorganic particles with reactive acrylate groups.

(ii) Synthesis of Photo-Sensitive Imide (PSI)

Photo-sensitive imide is synthesized from dianhydride and diamine at room temperature in N2 atmosphere condition. Hexafluoroisopropylidenedianhydride (6FDA) (4.09 g, 2.05 mol) and hexafluoromesityldiamine (6FpDA) (1.5 g, 1 mol) are dissolved in 23 and 11 mL of dimethylacetamide (DMAC) respectively, then the diamine solution was added to the dianhydride solution to form the polyamic acid. $N_2$ purge the formed polyamic acid, then add acetic anhydride (1.69 mL) and pyridine (1.83 mL) to the system. Next, heat the solution to 90° C. under stirring for 7 hr to form the imide oligomer.

The imide solution is then cooled, and processed in a centrifugal separator to remove unreacted reactants. Then, perform a precipitation process; the recovered white precipitate is dried under vacuum at 150° C. for 24 hr to form a dianhydride end-group functionality imide powder. The imide powder (4 g, 1 mol) is redissolved in DMAC to form a solution which is then reacted with HEMA (2.20 g, 5 mol) and hydroquinone (0.029 g, 0.073 mol) at 75° C. for 24 hr in an air atmosphere condition. Next, remove the unreacted reactants, and the desired photo-sensitive imide is obtained.

(iii) Preparation of Nanocomposite Material

The surface modified inorganic nano-particles from step (i) is mixed with TEGDA, EOBDA and the photo-sensitive imide from step (ii). The mixture is further mixed with a photo-initiator. The mixing process is performed in an opaque reactor. Stir the reacting mixture for 1 hour, and then remove the solvent in a vacuum environment to obtain a solvent-free acrylate nanocomposite solution.

(iv) Photopolymerization of Acrylate Nanocomposite Material

The solvent-free acrylate nanocomposite material from step (iii) is casted in a polyethylene terephthalate (PET) mold and then cured by UV irradiation (365 nm, 1.86 mW/cm2) for 2 minutes in a N2 chamber, so as to form an organic/inorganic 3D nanocomposite.

The weight compositions of the obtained acrylate nanocomposite material (labeled as FS and NPS series) are given in Table 1. The photo-initiator content in 4 wt %.

TABLE 1

| sample | composition (wt %) | | | | | |
|---|---|---|---|---|---|---|
| | SiO$_2$ | MPS | TEGDA | EOBDA | NPGDA | PSI |
| FS00 | 0 | 0 | 70 | 30 | 0 | 0 |
| FS10 | 9.43 | 2.36 | 61.75 | 26.46 | 0 | 0 |
| FS20 | 18.87 | 4.72 | 53.49 | 22.92 | 0 | 0 |
| FS30 | 28.29 | 7.08 | 45.24 | 19.39 | 0 | 0 |
| FS40 | 37.74 | 9.43 | 36.98 | 15.85 | 0 | 0 |
| FS50 | 47.17 | 11.79 | 28.73 | 12.31 | 0 | 0 |
| FS60 | 56.60 | 14.15 | 20.47 | 8.77 | 0 | 0 |
| NPS00 | 0 | 0 | 0 | 0 | 70 | 30 |
| NPS10 | 9.05 | 4.52 | 0 | 0 | 60.50 | 25.93 |
| NPS20 | 18.10 | 9.05 | 0 | 0 | 51.00 | 21.86 |
| NPS30 | 27.15 | 13.57 | 0 | 0 | 41.50 | 17.78 |
| NPS40 | 36.20 | 18.10 | 0 | 0 | 31.99 | 13.71 |
| NPS50 | 45.15 | 22.62 | 0 | 0 | 22.49 | 9.64 |
| NPS60 | 54.30 | 27.15 | 0 | 0 | 12.99 | 5.57 |

As shown, all films have a light transmittance above 90%, therefore are suitable for optoelectronic device encapsulation. Such result is also shown in FIG. 1.

Figure 2:
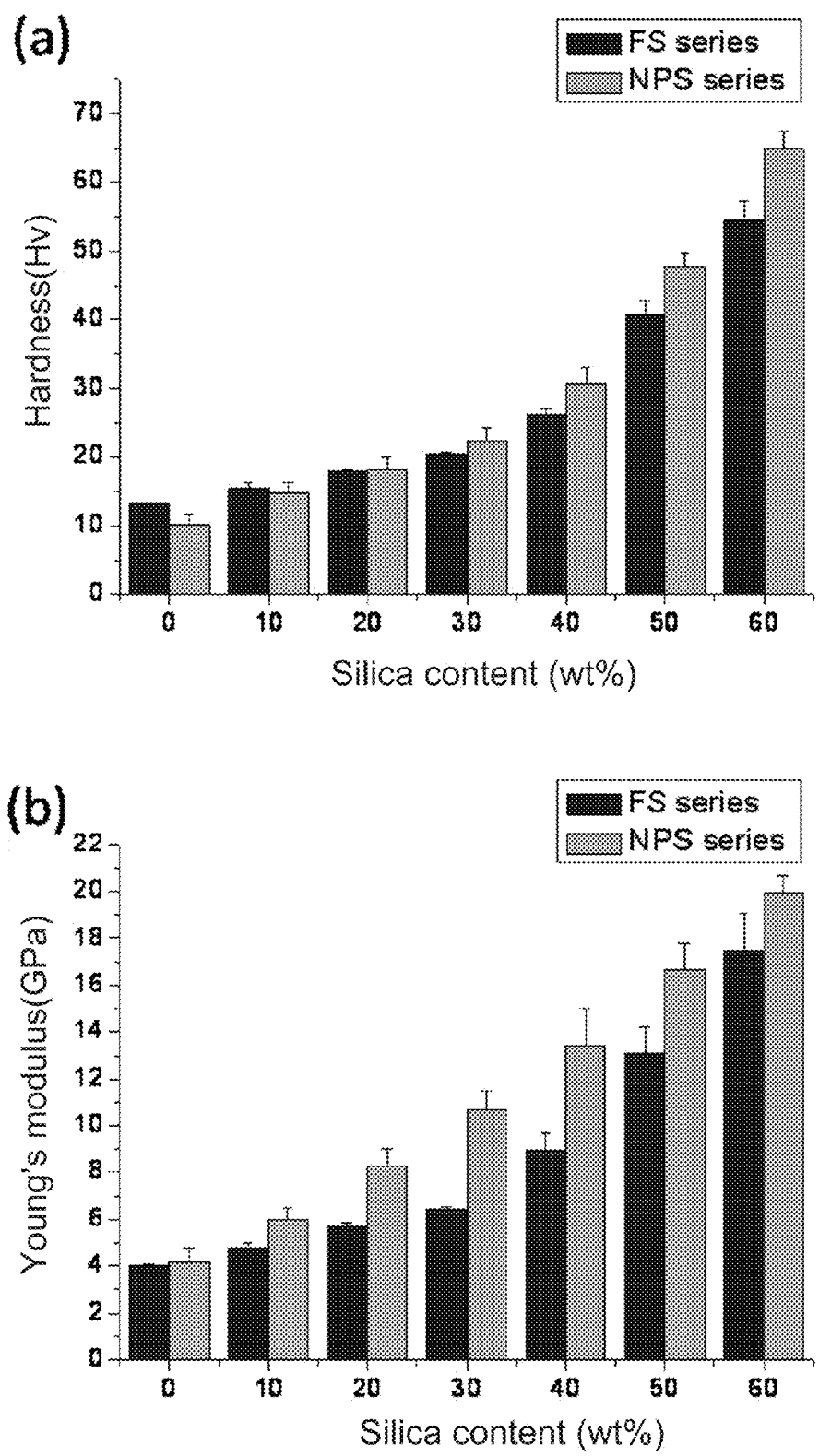
FIG. 2 is a diagram showing the hardness and Young's modulus of the organic/inorganic nanocomposite with various compositions.

As shown in FIG. 2, the hardness and Young's modulus, thus the mechanical property, of the disclosed nanocomposite material increases with its silica content.

Figure 3:
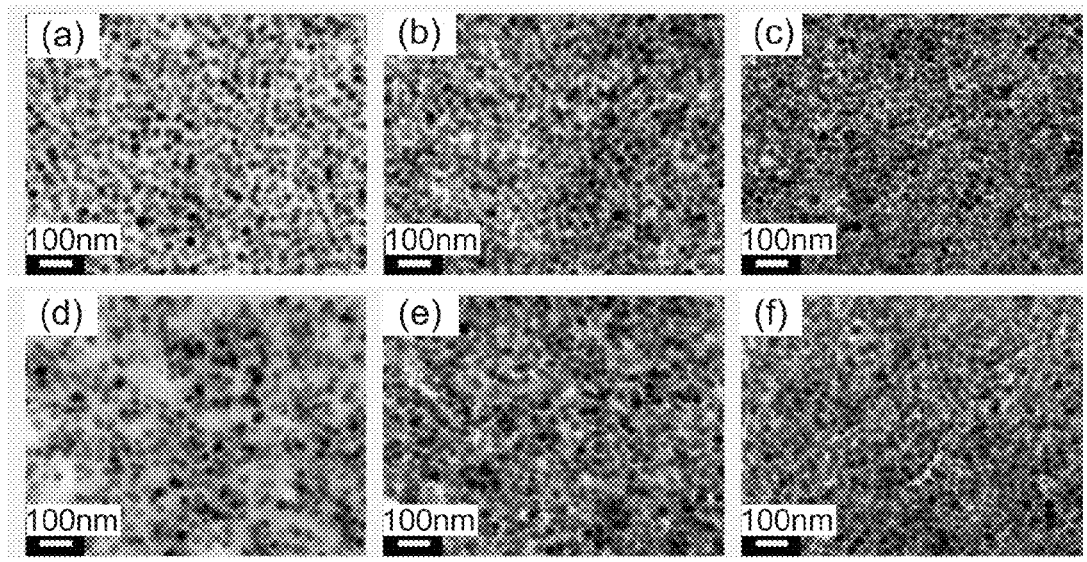
FIG. 3 illustrates a TEM picture of the organic/inorganic nanocomposite with various compositions, wherein the sample labeled (a) is FS20, sample (b) is FS40, sample (c) is FS60, sample (d) is NPS20, sample (e) is NPS40, and sample (f) is NPS60.

Further, as shown in FIG. 3, the inorganic particles are observed to be tightly packed in the nanocomposite. Note that in FIG. 3 the sample labeled (a) is FS20, sample (b) is FS40, sample (c) is FS60, sample (d) is NPS20, sample (e) is NPS40, and sample (f) is NPS60.

Figure 4:
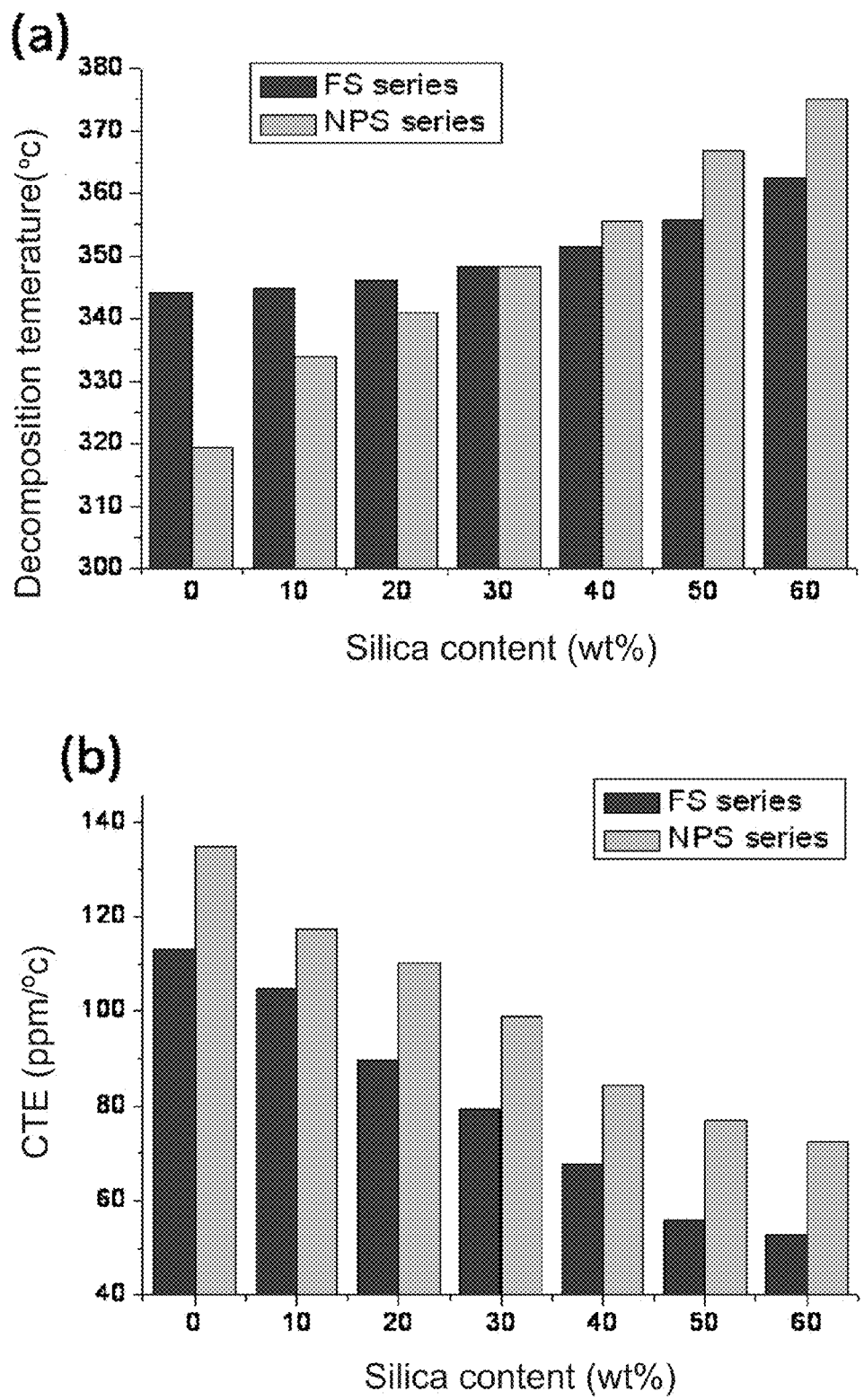
FIG. 4 is a diagram showing the thermal decomposition temperature and coefficient of thermal expansion of the organic/inorganic nanocomposite with various compositions.

The disclosed nanocomposite material is observed to have an improved heat stability due to the presence of the inorganic filler (i.e. the inorganic particles). FIG. 4 indicates the decomposition temperature (Td) and coefficient of thermal expansion (CTE) of the disclosed nanocomposite material.

Figure 5:
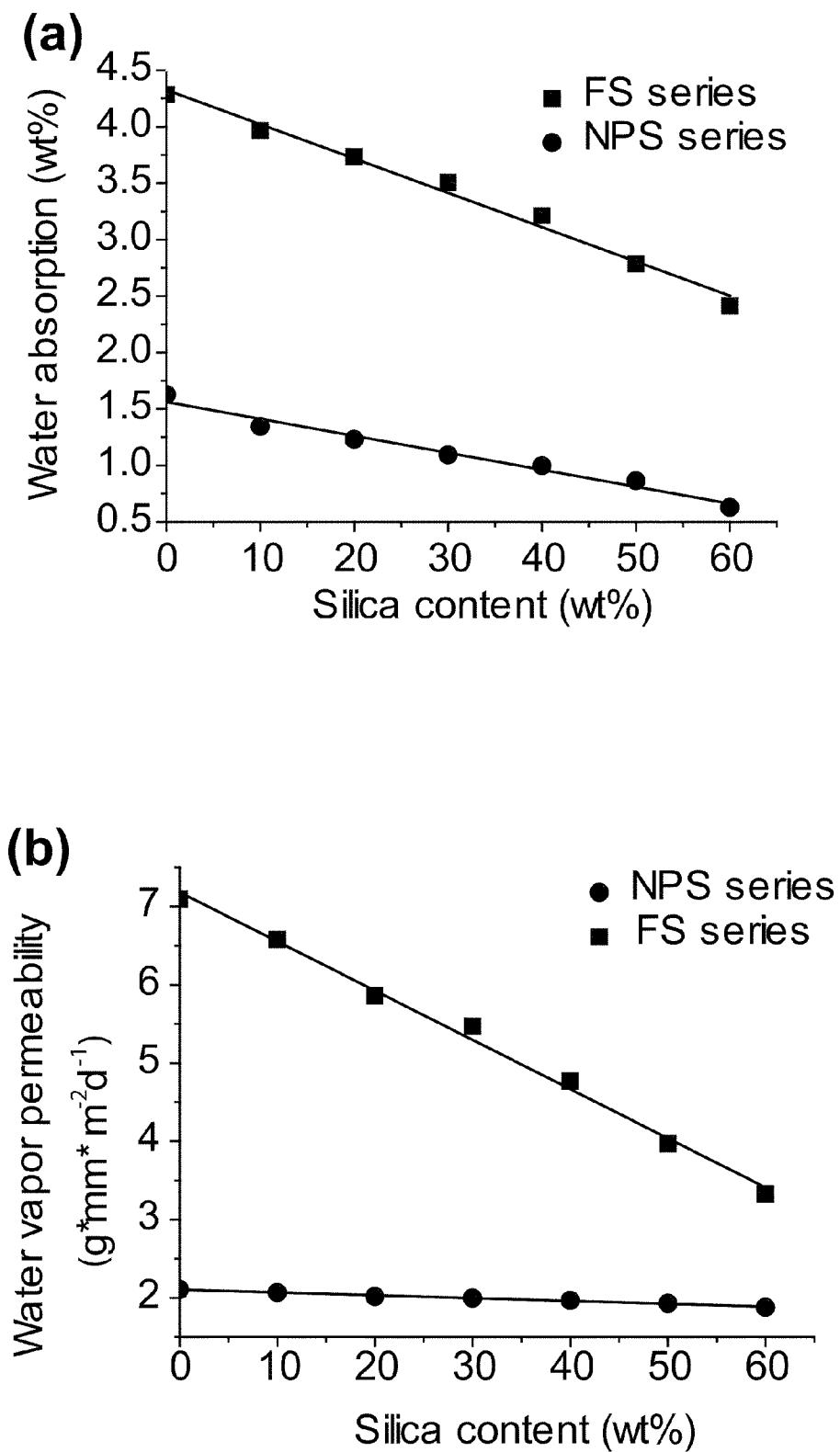
FIG. 5 is a diagram showing the water absorption rate (%) and water permeation rate (g/m$^2$·hr) of the organic/inorganic nanocomposite with various compositions.

Water absorption and permeation rate of the disclosed nanocomposite are shown in FIG. 5, respectively. It can be seen from FIG. 5 that the NPS series samples which contain the imide show a much lower water absorption and permeation rate than the FS series samples which do not contain the imide.

What is claimed is:
1. An acrylate nanocomposite material, comprising:
a inorganic nano-particle obtained from an inorganic nano-particle colloidal solution and a coupling agent, said inorganic nano-particle colloidal solution comprising a surface that has a first inorganic nano-particle with a first silanol functional group, said coupling agent comprising an acrylate group at one end, and one to three alkoxide group at the other end, wherein said coupling agent undergoes a hydrolysis reaction after which said alkoxide group forms a second silanol functional group, said first and second silanol functional groups then react with each other to form a bonding therebetween, resulting in a reactive acrylate group on the surface of said inorganic nano-particle;

an acrylate monomer with at least two acrylate groups;

an imidized acrylate oligomer which comprises a first structure and a second structure, said first structure comprising an imide oligomer formed from a diamine monomer and a dianhydride monomer, said second structure is a hydroxy acrylate monomer; and a photo-initiator, wherein said acrylate nanocomposite material has an organic/inorganic 3D network formed through a photopolymerization reaction.

2. The material according to claim 1, wherein the acrylate nanocomposite material content 10% to 80% inorganic nano-particle.

3. The material according to claim 1, wherein the average particle size of the inorganic nano-particle range from 10 nm to 100 nm.

4. The material according to claim 1, wherein the inorganic nano-particle comprises one compound selected from the group consisting of the following or any combination thereof: $SiO_2$, $ZrO_2$, $TiO_2$, $Al_2O_3$, $ZnO_2$, $Fe_2O_3$, $SnO_2$, $Y_2O_3$, $GeO_2$, $Ni_2O_3$ and $HfO_2$.

5. The material according to claim 1, wherein the coupling agent comprises one compound selected from the group consisting of the following or any combination thereof: 3-methacryloxypropyl trimethoxysilane (MPS), 3-methacryloxypropylmethyl dimethoxysilane, 3-acryloxypropyl trimethoxysilane, 2-methacryloxyethyl trimethoxysilane, 2-acryloxyethyl trimethoxysilane, 3-methacryloxypropyl triethoxysilane, 3-acryloxypropyl triethoxysilane, 2-methacryloxyethyl triethoxysilane, and 2-acryloxyethyl triethoxysilane.

6. The material according to claim 1, wherein the acrylate nanocomposite material further comprising at least one compound with acrylate group, wherein the compound is a monomer or an oligomer.

7. The material according to claim 6, wherein the compound with acrylate group comprises one compound selected from the group consisting of the following or any combination thereof: 1,4-butanediol diacrylate (BDDA), 1,4-butanediol dimethacrylate (BDDMA), 1,3-butylene glycol diacrylate (BGDA), 1,3-butylene glycol dimethacrylate (BGDMA), diethylene glycol diacrylate (DEGDA), diethylene glycol dimethacrylate (DEGDMA), dipropylene glycol diacrylate (DPGDA), ethylene glycol dimethacrylate (EGDMA), ethoxylated bisphenol A diacrylate (EOBDA), 1,6-hexanediol diacrylate (HDDA), 1,6-hexanediol dimethacrylate (HDDMA), neopentyl glycol diacrylate (NPGDA), neopentyl glycol dimethacrylate (NPGDMA), tetraethylene glycol diacrylate (TEGDA), tetraethylene glycol dimethacrylate (TEGDMA), triethylene glycol diacrylate (3EGDA), triethylene glycol dimethacrylate (3EGDMA), and tripropylene glycol diacrylate (TPGDA).

8. The material according to claim 1, wherein hydroxy acrylate monomer comprises one compound selected from the group consisting of the following or any combination thereof: ethoxylated hydroxyethyl methacrylate (EO-HEMA), 4-hydroxybutyl acrylate (4HBA), 2-hydroxyethyl methacrylate (HEMA), 2-hydroxypropyl methacrylate (HPMA).

9. The material according to claim 1, wherein the diamine and dianhydride monomers react to form an imide oligomer, wherein the imide then reacts with the hydroxylpropyl ester monomer to form the imidized acrylate oligomer.

10. The material according to claim 8, wherein the imidized acrylate oligomer has a general formula as the following:

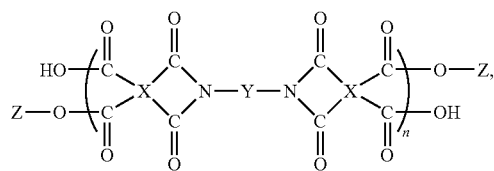

wherein n≧1, and X is selected from a group consisting of the following:

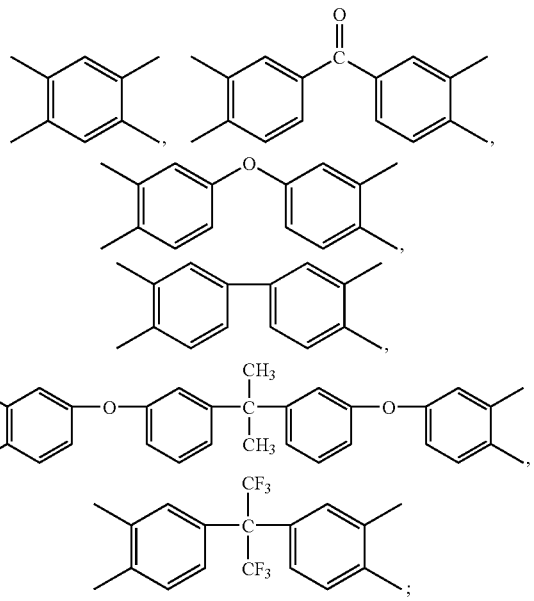

wherein Y is selected from a group consisting of the following:

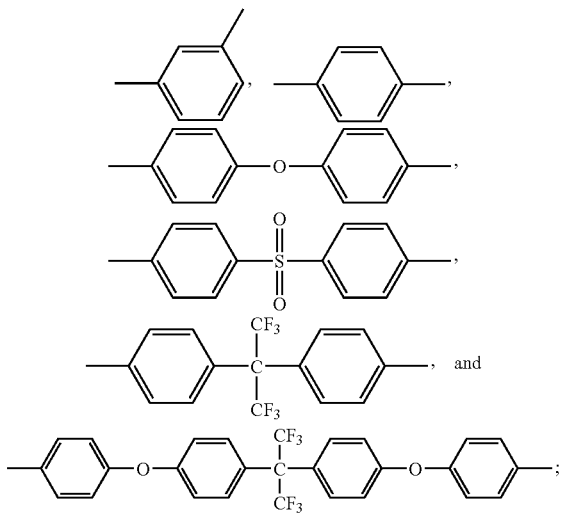

wherein Z is a hydroxylpropyl ester acrylate monomer.

11. The material according to claim 1, wherein the photoinitiator comprises one compound selected from the group consisting of the following or any combination thereof: 2,2-dimethoxy-2-phenyl-acetophenone, 1-hydroxy cyclohexyl-phenyl-ketone,

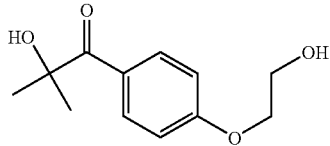

2-hydroxy-1-[4-(2-hydroxyethoxy)phenyl]-2-methyl-1-propanone

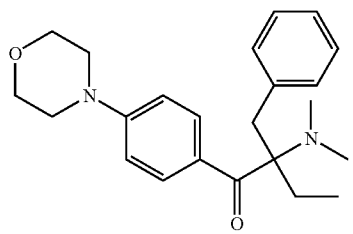

2-benzyl-2-(dimethylamino)-1-[4-(4-morpholinyl)phenyl]-1-butanone and

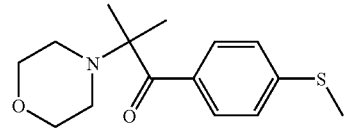

2-methyl-1-[4-(methylthio)phenyl]-2-(4-morpholinyl)-1-propanone.

12. The material according to claim 1, wherein the acrylate nanocomposite material can be applied for optoelectronic device encapsulation, dental restorations and light waveguide.

13. The material according to claim 1, wherein the water absorption rate of the organic/inorganic percolation network is in the range from 0.01 to 5.00%.

14. The material according to claim 1, wherein the water permeation rate of the organic/inorganic percolation network is in the range from 0.01 to 10.00 g mm/m$^2$ day.

* * * * *